US00RE41103E

(19) United States
(12) Reissued Patent
Barraclough et al.

(10) Patent Number: US RE41,103 E
(45) Date of Reissued Patent: Feb. 9, 2010

(54) REMOTE ELECTROMECHANICAL CONTROL OF A VIDEO COMMUNICATIONS SYSTEM

(75) Inventors: Keith Barraclough, Mountain View, CA (US); Bryan R. Martin, Santa Clara, CA (US)

(73) Assignee: 8×8, Inc., Sunnyvale, CA (US)

(21) Appl. No.: 10/403,898

(22) Filed: Mar. 27, 2003

(Under 37 CFR 1.47)

Related U.S. Patent Documents

Reissue of:
(64) Patent No.: 6,208,372
Issued: Mar. 27, 2001
Appl. No.: 09/363,509
Filed: Jul. 29, 1999

(51) Int. Cl.
*H04N 7/14* (2006.01)
*G06F 15/16* (2006.01)

(52) U.S. Cl. ..... 348/14.16; 348/14.05; 348/14.08

(58) Field of Classification Search .... 348/14.01–14.16; 379/93.21, 93.17; 455/556.1, 556.2, 557; 709/204; 345/330, 332, 339, 340, 341
See application file for complete search history.

(56) References Cited

U.S. PATENT DOCUMENTS 5,339,076 A * 8/1994 Jiang ..... 341/51
5,379,351 A * 1/1995 Fandrianto et al. ..... 382/236
5,657,246 A * 8/1997 Hogan et al. ..... 348/14.1
5,745,161 A * 4/1998 Ito ..... 348/14.09
6,313,864 B1 * 11/2001 Tabata et al. ..... 348/14.02
6,704,048 B1 * 3/2004 Malkin et al. ..... 348/240.2

FOREIGN PATENT DOCUMENTS

JP 406351010 A * 12/1994

OTHER PUBLICATIONS

Marsovich et al.; Method and Apparatus for ON–Screen Camera control in Videoconference equipment; Mar. 31, 1994; WO 94/07327.*

* cited by examiner

*Primary Examiner*—Melur Ramakrishnaiah
(74) *Attorney, Agent, or Firm*—Crawford Maunu PLLC

(57) ABSTRACT

According to an example embodiment, the present invention is directed to a video communication system having a user-friendly, intuitive-like control for altering the video camera view at a remote terminal. The local terminal includes a display and a movement-responsive sensor arranged to generate a direction signal in response to corresponding movement at the display. At least one of the first and second computer arrangements is configured and arranged to alter data being sent to the display in response to the direction signal from the movement-responsive sensor.

45 Claims, 2 Drawing Sheets

REMOTE ELECTROMECHANICAL CONTROL OF A VIDEO COMMUNICATIONS SYSTEM

Matter enclosed in heavy brackets [ ] appears in the original patent but forms no part of this reissue specification; matter printed in italics indicates the additions made by reissue.

RELATED APPLICATIONS

This related to "ARRANGEMENT FOR CONTROLLING THE VIEW AREA OF A VIDEO CONFERENCING DEVICE AND METHOD THEREFORE," U.S. patent application Ser. No. 08/861,619, filed May 22, 1997, and is incorporated herein by reference in its entirety.

FIELD OF THE INVENTION

The present invention relates to video communication systems. More particularly, the present invention relates to configuring and controlling the displayed view of a video communication system.

BACKGROUND OF THE INVENTION

An increasing number of communication applications are realizing the benefits of video-conferencing equipment. Such equipment generally includes two or more communication terminals participating in the transmission and/or reception of data representing captured video images, typically along with signals representing speech. One type of conventional video-conferencing arrangement includes at least one communication terminal set up with a camera, an image processor, and a transmission device transmitting captured video images for display at the other terminal(s).

While the benefits of video-conferencing equipment are widely recognized, extensive use of video-conferencing equipment has been inhibited largely due to cost, inconvenience and video quality. Increased video quality and convenience have proven to be costly considerations. For this reason, there have been opposing pressures to develop certain more inexpensive systems with increased video quality and convenience and certain other systems that forego the convenience and quality criteria for the sake of reducing costs. Other factors inhibiting extensive use of such equipment include equipment size and maintenance requirements.

As an example, there have been significant efforts to develop the convenience aspect of video conferencing technology by controlling a video conferencing camera for camera adjustment features, such as pan, tilt or zoom. Because the camera is at a location remote from the displayed image, controlling the camera must be coordinated between the two locations. Heretofore, controlling the camera has required methods that are non-intuitive and often difficult to learn. Consequently, the potential to expand the uses of such equipment has been impeded.

SUMMARY OF THE INVENTION

The present invention is exemplified in a number of implementations and applications, some of which are summarized below. In one example embodiment, the present invention permits a user of a local video communication (e.g., video-conferencing or video-monitoring) terminal to ostensibly or actually control the camera view at the remote terminal. This is achieved by the user physically moving (e.g., exerting a slight force to engage a pressure sensitive device or perceptibly displacing from a position for a time) the local display screen so that the displayed view changes as desired. An electromechanical device is used to sense and report the movement for subsequent video-image processing. In one more particular embodiment, the reported information is transmitted to the remote terminal and used to control the far-end camera at the remote terminal, for example, to adjust the image captured by the far-end camera and/or to maintain view of user at local terminal as viewed at the remote terminal. In another particular embodiment, this information is used at the local terminal, via digital manipulation of the received picture, to adjust the image locally and/or to transmit a different image for the remote terminal.

According to another example embodiment, the present invention is directed to a video communication system having a user-friendly control for altering video data. The system includes a first video communication terminal having a first computer arrangement for processing data including video data. The data is communicated over a communications channel. The first video communication terminal further includes a camera configured and arranged to capture images of a view. The captured images are processed as data by the first computer arrangement for transfer over the communications channel. The system further includes a second video communication terminal including a display and a movement-responsive sensor configured and arranged to generate a direction signal in response to corresponding movement of the display. The second terminal further includes a second computer arrangement for processing data, including video data, for communicatively coupling with the first video communication terminal over the communications channel. At least one of the first and second computer arrangements is configured and arranged to alter data being sent to the display in response to the direction signal from the movement-responsive sensor.

According to another example embodiment, the present invention is directed to a video communication system having a remotely-controlled camera. The system includes a first video communication terminal having a first computer arrangement for processing data including video data. The data is communicated over a communications channel. The first video communication terminal further includes a camera configured and arranged to capture images of a view. The captured images are processed as data by the first computer arrangement for transfer over the communications channel. The first computer arrangement is configured and arranged to transfer data, in response to a control signal received over the communications channel, representing an altered view being captured by the camera. The system further includes a second video communication terminal including a display and a movement-responsive sensor configured and arranged to generate a direction signal in response to corresponding movement of the display. The second terminal further includes a second computer arrangement for processing data, including video data, for communicatively coupling with the first video communication terminal over the communication channel. The second computer arrangement is configured and arranged to respond to the movement-responsive sensor by sending the control signal to the first video communication terminal over the communications channel.

According to another embodiment, the present invention is directed toward a video communication system having a camera that is ostensibly remotely controlled with data manipulation at a remote terminal. The system includes a first video communication terminal having a first computer arrangement for processing data including video data. The data is communicated over a communications channel. The first video communication terminal further includes a camera configured and arranged to capture images of a view. The captured images are processed as data by the first computer arrangement for transfer over the communication channel. The system further includes a second video communication terminal including a display and a movement-responsive sensor configured and arranged to generate a direction signal in response to corresponding movement of the display. The second terminal further includes a second computer arrangement for processing data, including video data, for communicatively coupling with the first video communication terminal over the communications channel. The second computer arrangement is configured and arranged to store video data received over the communications channel and to respond to the movement-responsive sensor by changing data being sent to the display such that only a portion of the stored video data is displayed.

According to other, more specific, example embodiments, the present invention is directed to the second video communication terminal including a movement-responsive sensor and a display physically coupled to the movement-responsive sensor. The movement-responsive sensor generates a direction signal in response to corresponding movement of the display. The second video communication terminal further includes a second computer arrangement for processing data, including video data, for communicatively coupling with the first video communication terminal over the communications channel. At least one of the first and second computer arrangements is configured and arranged to alter data being sent to the display in response to the direction signal from the movement-responsive sensor.

According to another example embodiment, the present invention is directed toward a method for communication. Video data is gathered via a first communication terminal having a first computer arrangement for processing data including video data. The video data is transferred over a communications channel. The video data is received via a second communication terminal having a display and a second computer arrangement for processing data including video data. The second communication terminal is coupled communicatively with the first communication terminal over the communications channel. Movement of the display is detected via a movement-responsive sensor configured and arranged to generate a direction signal in response to corresponding movement of the display. A direction signal is generated in response to the movement of the display. The video data is altered responsive to the direction signal from the movement-responsive sensor.

The above summary of the present invention is not intended to describe each illustrated embodiment or every implementation of the present invention. The figures and detailed description with follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
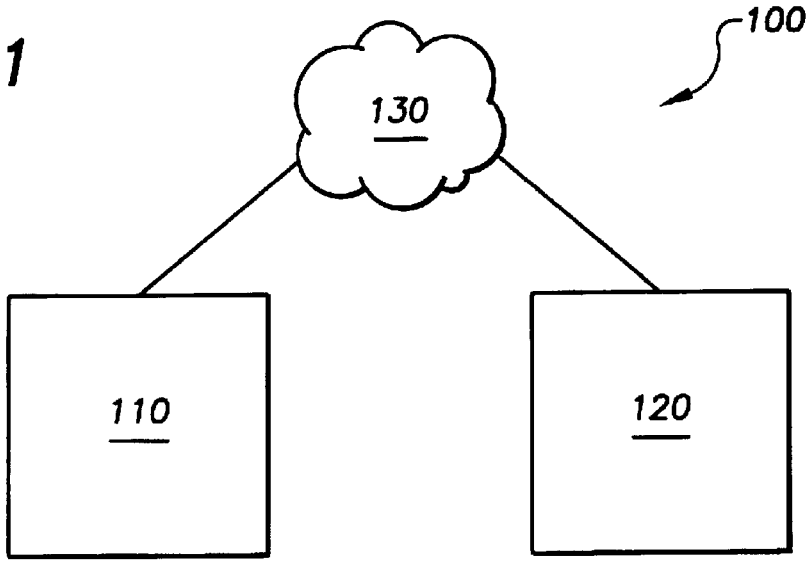
FIGS. 1 and 1A show example video communications systems, according to example embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of video communication systems, and the invention has been found to be particularly advantageous in video communication applications requiring, or benefiting from, pan, tilt and/or zoom camera-control functions for the display of such images at a remote video communication site. In connection with the present invention, it has been discovered that users have a natural tendency to attempt to adjust the view at the remote video communication site, by moving the display at the local site. The present invention addresses such intuitive control of video images at the remote video communication site. An appreciation of various aspects of the invention is best gained through a discussion of various application examples operating in such an environment.

According to an example embodiment, FIG. 1 shows a video communication system 100. The system includes a first video communication terminal 110 having a first computer arrangement for processing data, including video data. The data is communicated over a communications channel 130. The first video communication terminal 110 further includes a camera configured and arranged to capture images of a view. The captured images are processed as data by the first computer arrangement for transfer over the communications channel 130. The system further includes a second video communication terminal 120 including a display and a movement-responsive sensor, configured and arranged to generate a direction signal in response to corresponding movement of the display. The second terminal 120 further includes a second computer arrangement for processing data, including video data, for communicatively coupling with the first video communication terminal 110 over the communications channel 130. At least one of the first and second computer arrangements is configured and arranged to alter data being sent to the display in response to the direction signal from the movement-responsive sensor.

The movement-responsive senor may, for example, include a transducer, such as a position transducer or a displacement transducer. In another example embodiment, the movement-responsive sensor may include a piezoelectric crystal. In still another example embodiment, the movement-responsive sensor may include pressure-sensitive or conductive thin-film substance, modified to include direction detection such as the center of a lap-top computer's finger-controlled mouse, such as the TMS920 touchpad module available from Cirque Corp. of Salt Lake City, Utah.

The communications system 130 may include one or more communication methods. For instance, the communications system may include communication using digital or analog signals. The system may also include a wireless method of communication, such as radio frequency communications. In addition, the communications system may include a wired communication. Such communication may take place using a system such as a plain-old-telephone system (POTS), or such as an ISDN line. Another example communications system may include the Internet. According to another example embodiment of the present invention, the video data displayed is altered responsive to the direction signal. For instance, the second computer arrangement may be configured and arranged to store video data received over the communications channel. Only a portion of the video data is displayed, responsive to the direction signal. In addition, the first computer arrangement may be configured and arranged to transfer data representing an altered view being captured by the camera, in response to a control signal received over the communications channel. According to another example embodiment, the view being captured may be altered by mechanical means at the camera, responsive to the direction signal. Altering the video display may, for example, have the effect of paneling, tilting, and/or zooming (zooming in and/or zooming out).

According to another example embodiment, the movement-responsive sensor may be physically coupled to the display. The movement-responsive sensor is configured and arranged to generate a direction signal responsive to movement of the display.

In another embodiment, a supporting member is physically coupled to the display at the video communication terminal. The supporting member may, for example, include components such as suspension members, rigid members, flexible members, a display base, and multiaxis support member systems such as an articulating arm. The movement-responsive sensor is coupled to sense movement of the supporting member relative to the display. For instance, the movement-responsive sensor may be coupled to the display itself. In another instance, the movement-responsive sensor may be coupled to the supporting member.

According to another example embodiment of the present invention, the first video communication terminal further includes a display. A movement-responsive sensor is configured and arranged to generate a direction signal in response to corresponding movement of the display. The direction signal is communicatively coupled with the communications channel. In addition, the second video communications terminal may further include a camera configured and arranged for capturing images of a video, according to another example embodiment of the present invention. The captured images are processed as data by the second computer arrangement for transfer over the communications channel.

In addition to video data, and according to another example embodiment of the present invention, the first video communication terminal further includes a microphone configured and arranged to gather audio. The audio is processed as data by the first computer arrangement for transfer over the communications channel. The second computer arrangement further is configured and arranged to process audio data. Similarly, the second video communication terminal may further include a microphone configured and arranged to gather audio, according to another example embodiment. The audio is processed as data by the second computer arrangement for transfer over the communications channel. The first computer arrangement further is configured and arranged to process audio data.

In another example embodiment, the video communications system further includes a third video communication terminal. The terminal has a display and a movement-responsive sensor configured and arranged to generate a direction signal in response to corresponding movement of the display. A third computer is configured and arranged for processing data including video data, and for communicatively coupling with the first video communication terminal over the communications channel. The first computer arrangement is configured and arranged to electronically alter data being sent to the third video communication terminal in response to the direction signal from the movement-responsive sensor at the third video communications terminal. The first computer arrangement is further configured and arranged to electronically alter data being sent to the display at the second video communication terminal in response to the direction signal from the movement-responsive sensor at the second video communications terminal. For instance, electronically altering the data may include electronically altering the data in a different manner according to the direction signal received from each terminal.

In another related example embodiment, the video communications system includes the camera being integral with the display, wherein in response to the display being moved, information reported in response to the movement sensor is used by the local image processor/camera (or remote image processor/camera) to readjust the local view for the remote display. This is accomplished, of course, using one or more of the image manipulation methods discussed herein.

In certain applications, the display and the movement-responsive sensor can be configured and arranged as a single unit, such as a TouchScreen, one of which is a Pixel 13M20 CRT available from PixelTouch, Inc. of Ontario, Canada.

Referring again to FIG. 1, and according to another example embodiment, the present invention is directed toward a method for communication. Video data is gathered via a first communication system 110 having a first computer arrangement for processing data including video data. The video data is transferred over a communications channel 130. The video data is received via a second communication terminal 120 having a display and a second computer arrangement for processing data including video data. The second communication terminal 120 is coupled communicatively with the first communication terminal 110 over the communications channel 130. Movement of the display is detected via a movement-responsive sensor configured and arranged to generate a direction signal in response to corresponding movement of the display. A direction signal is generated in response to the movement of the display. The video data is altered responsive to the direction signal from the movement-responsive sensor. For instance, altering the video data may include altering at least one of the pan, tilt, and zoom aspects of the video data.

Figure 1A:
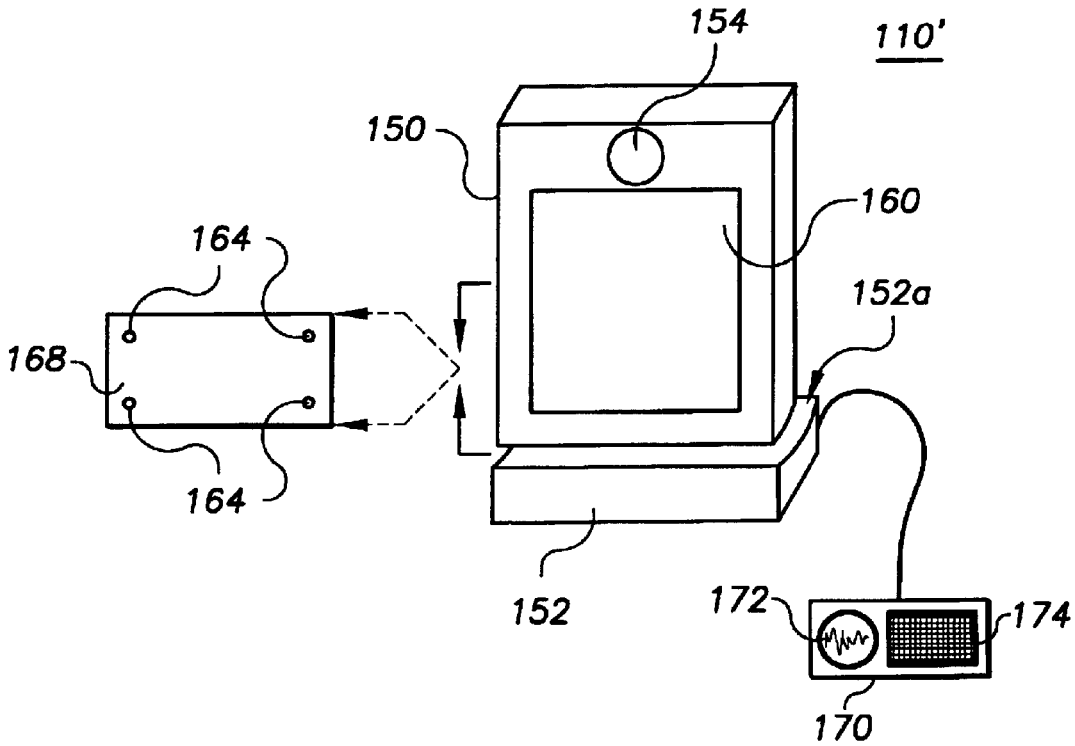

FIG. 1A illustrates a more specific embodiment of an example video communication terminal 110' that may or may not be implemented with a similarly-constructed and remotely-located communication terminal (such as 120 of FIG. 1). Using an arrangement of this type, a relatively compact video communications device can be realized with a housing unit 150 and a supporting by a 152. The housing unit 150 of this example video communication terminal 110' includes a built-in camera 154 and a built-in display 160. When a user moves the housing unit 150 relative to the supporting base unit 152, one or more sensors 164 located between the housing unit 150 and the base unit 152 sense the direction of the movement and signal the processor arrangement internal to the terminal 110' accordingly. In this embodiment, the sensor(s) 164 may be located adjacent the bottom surface of the housing unit 150 or located adjacent the top surface of the base unit 152.

In FIG. 1A, this surface is depicted as 168 and includes four movement sensors 164. These sensors 164 can be used in various ways. For example, at least two opposing comer sensors can be used to sense panning effects, and the two front sensors and/or the two rear sensors can be used to sense zooming and tilting effects. In addition to the illustrated sensors 164 or as an alternative implementation, a sensor arrangement can also be located between the housing unit 150 and the base unit 152 at the back sides or front sides of the housing unit 150, with slight modification (from that shown) to include a front edge or a back edge to permit the engagement. The curvatures in at least one of the interfacing surfaces aid in permitting some degree of unrestricted movement; however, for other sensor implementations, such as a pressure-sensitive sensor, a curved surface is not as necessary or helpful. This is because the pressure can be used to alleviate the need for more than a very slight movement, for example, one or two degrees, and with the pressure sensor (or an interfacing spring) returning the position of the housing relative to the base unit. Further, using a pressure-sensitive sensor that is also configured to detect direction of the movement, a single sensor centrally located at the surface 168 or at the front or back edge is adequate.

The example implementation of FIG. 1A also shows a peripheral unit 170 for controlling the terminal 110'. Because the housing unit 150 can be moving at the same time as the peripheral unit 170 during adjustments and various types of uses, it is advantageous to separate the peripheral unit 170 from the housing unit 150. In another implementation of the present invention, the peripheral unit 170 is built-in to (e.g., as an extension or integral part of) the base unit.

In one implementation, the peripheral unit 170 includes a speakerphone-used directional speaker and microphone arrangement 172 and a key-based control pad 174. The speakerphone-used directional speaker and microphone arrangement can be implemented, for example, using a 1½ inch by 1¾ inch speaker (such as the NB04301-01 model available from Star Electronics, Inc.), and a 25-inch wire microphone assembly (M118HC-P81, available from MWM Acoustics, L.L.C.), with the video processor arrangement for processing the audio implemented within the housing 150. In another implementation, the peripheral unit 170 is implemented using a SP12 Speakerphone available from 8×8, Inc., and the arrangement including the housing 150 and the base unit 152 is implemented using a VC150 or VC160 ViaTV Videophone available from 8×8, Inc., with modifications to provide for the sensors described according to one of the embodiments above.

As an enhancement to the above operations, one or both of the video terminals can further include automatic adjustment capability to reposition the camera view after the local display 160 is moved with the housing 150. Moving the housing 150, (which includes both the local display and the camera 154), causes the local camera 154 to move. This, in turn, can trigger a pan movement of the display thereby causing the local camera 154 to transmit an image centered away from the user rather than centering on the user's face, as is typically desired in a single user video communication call. This problem is overcome by automatically adjusting the display viewed at the remote terminal using the previously-discussed manipulation of displaying a repositioned view of a larger view as captured and internally processed by the local or remote camera for the display at the remote terminal. Such an implementation is also advantageous as a general face-tracking feature whether the view repositioning is due to movement of the housing/display or due to the movement of the user.

For information regarding use of a peripheral device 170 for controlling the graphics and other aspects of the terminal 110' of FIG. 1A, or the connectivity of the terminal 110' to this type and other types of peripheral devices, reference may be made to U.S. patent application Ser. No. 09/095,448, Documents entitled "Videocommunicating Device with an On-Screen Telephone Keypad user-Interface Method and Arrangement," filed on Jun. 1, 1998, and application Ser. No. 08/977,568, entitled "Interface Arrangement and Method for Exchanging Information Between Video Communication System and Peripheral," filed on Nov. 25, 1997, now U.S. Pat. No. 6,119,178, issued Sep. 12, 2000 each of which is incorporated herein by reference and assigned to 8×8, Inc. of Santa Clara, Calif.

Figure 2:
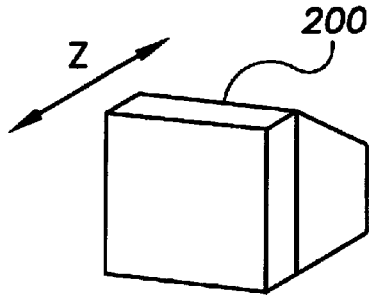
FIG. 2 shows a perspective view of a display, according to an example embodiment of the present invention.
Figure 3:
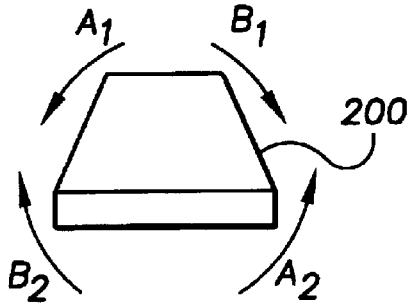
FIG. 3 shows a top view of a display, according to an example embodiment of the present invention.
Figure 4:
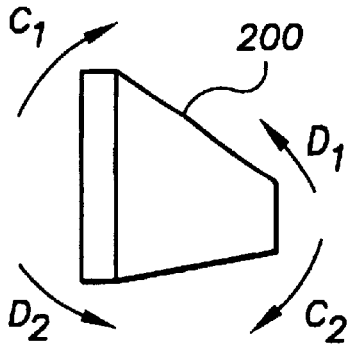
FIG. 4 shows a side view of a display, according to an example embodiment of the present invention.

Turning now to FIGS. 2–4, a video display 200 is shown, according to an example embodiment of the present invention. FIG. 2 shows a perspective view of the video display 200. When the display is manipulated in a direction shown by arrow Z, a movement-responsive sensor generates a direction signal in response to the movement. The direction signal corresponds to a zoom-in or zoom-out signal, depending upon the direction of movement. (This movement may be in the form of pressure, temporary and/or permanent movement of the display.)

FIG. 3 shows a top view of the display 200. When the display is manipulated in the direction of arrows A1 and A2, or arrows B1 and B2, the movement-responsive sensor generates a direction signal in response to the movement. The direction signal corresponds to a pan signal.

FIG. 4 shows a side view of the display 200. When the display is manipulated in the direction of arrows C1 and C2, or arrows D1 and D2, the movement-responsive sensor generates a direction signal in response to the movement. The direction signal corresponds to a tilt signal.

In another implementation, also according to an example application of the present invention, the display is manipulated by rotating the display in a clockwise or counter clockwise direction to provide an image rotation view. Rotating the display, or applying a consistent pressure that is detected by the movement sensor for a predetermined period of time, permits the view to rotate a desired amount, for example, 20 degrees, 45 degrees, or even full 360 degrees.

Yet another specific embodiment, which may be used to incorporate the general operation flows described above, is directed to processor-based controller arrangement including both RISC and DSP computer architectures. Using an arrangement of this type, a more compact video communications device can be realized with a single unit combining the camera and processor-control functions, or alternatively, with a single unit combining the display, camera and all processor-control functions. Specifically, by incorporating this technology into a stand-alone unit, such as one of the ViaTV units available from 8×8, Inc., the operational flow depicted in the above-characterized embodiments can be implemented without any moving parts, except for the movement sensor that is built into the display. For more information regarding computer-architectures of this type, reference may be made to U.S. Pat. Nos. 5,379,351 and 5,339,076, and application Ser. No. 09/095,448, entitled "Videocommunicating Device with an On-Screen Telephone Keypad User-Interface Method and Arrangement," filed on Jun. 1, 1998, each of which is incorporated herein by reference and assigned to 8×8, Inc. of Santa Clara, Calif., and to chip-set based products available from 8×8, Inc. including the VC150 or VC160 desktop (with or without the speakerphone).

While the present invention has been described with reference to several particular example embodiments, those skilled in the art will recognize that many changes may be made thereto without departing from the spirit and scope of the present invention. For example, the skilled artisan will recognize that various functional and structural combinations of the above embodiments permit various advantages; among others, such advantages include added control of image presentation and added control over which camera (local or remote) is actually causing the changed images. The scope of the invention is set forth in the following claims.

What is claimed is:

1. A video communication system, comprising:

a first video communication terminal including a first computer arrangement for processing data, including video data, that is communicated over a communications channel, and including a camera configured and arranged to capture images of a view, wherein the captured images are processed as data by the first computer arrangement for transfer over the communications channel; and a second video communication terminal including a display, a movement-responsive sensor configured and arranged to generate a direction signal in response to corresponding movement of the display, and a second computer arrangement for processing data, including video data, for communicatively coupling with the first video communication terminal over the communications channel, wherein at least one of the first and second computer arrangements is configured and arranged to alter data being sent to the display in response to the direction signal from the movement-responsive sensor.

2. A video communication system, according to claim 1, wherein the movement-responsive sensor includes one of a position transducer and a displacement transducer.

3. A video communication system, according to claim 1, wherein the second video communication terminal further includes a camera being integral with the display, wherein data being sent to the display is altered to compensate for movement of the camera in response to the direction signal from the movement-responsive sensor.

4. A video communication system, according to claim 1, wherein the movement-responsive sensor includes a piezoelectric crystal.

5. A video communication system, according to claim 1, wherein the movement-responsive sensor includes pressure-resistive material.

6. A video communication system, according to claim 1, wherein the second computer arrangement is further configured and arranged to store video data received over the communications channel and to respond to the direction signal by changing data being sent to the display such that only a portion of the stored video data is displayed.

7. A video communication system, according to claim 6, wherein the first computer arrangement is further configured and arranged to transfer data, in response to a control signal received over the communications channel, representing an altered view being captured by the camera.

8. A video communication system, according to claim 1, wherein the second video communication terminal includes a supporting member physically coupled to the display, and wherein the movement-responsive sensor generates a direction signal in response to movement of the supporting member relative to the display.

9. A video communication system, according to claim 1, wherein the movement-responsive sensor engages a rigid member physically coupled to the display, and wherein the movement-responsive sensor generates a direction signal in response to movement of the rigid member relative to the display.

10. A video communication system, according to claim 1, wherein altering data being sent to the display in response to the direction signal includes panning.

11. A video communication system, according to claim 1, wherein altering data being sent to the display in response to the direction signal includes tilting.

12. A video communication system, according to claim 1, wherein altering data being sent to the display in response to the direction signal includes zooming.

13. A video communication system, according to claim 1, wherein altering data being sent to the display in response to the direction signal includes electronically altering the data.

14. A video communication system, according to claim 1, wherein altering data being sent to the display in response to the direction signal includes mechanically altering the view being captured.

15. A video communication system, according to claim 1, wherein the first video communication terminal further includes a display, a movement-responsive sensor configured and arranged to generate a direction signal in response to corresponding movement of the display, for communicatively coupling with the second video communication terminal over the communications channel.

16. A video communication system, according to claim 1, wherein the second video communication terminal further includes a camera configured and arranged to capture images of a view, wherein the captured images are processed as data by the second computer arrangement for transfer over the communications channel.

17. A video communication system, according to claim 1, wherein the first video communication terminal further includes a microphone configured and arranged to capture audio, wherein the captured audio is processed as data by the first computer arrangement for transfer over the communications channel, and wherein the second computer arrangement processes audio data.

18. A video communication system, according to claim 1, wherein the second video communication terminal further includes a microphone configured and arranged to capture audio, wherein the captured audio is processed as data by the second computer arrangement for transfer over the communications channel, and wherein the first computer arrangement processes audio data.

19. A video communication system, according to claim 1, wherein the communications channel includes wireless communication.

20. A video communication system, according to claim 1, wherein the communications channel includes wired communication.

21. A video communication system, according to claim 1, wherein the communications channel includes a plain old telephone system (POTS).

22. A video communications system, according to claim 1, further comprising a third video communication terminal including a display, a movement-responsive sensor configured and arranged to generate a direction signal in response to corresponding movement of the display, and a third computer arrangement for processing data, including video data, for communicatively coupling with the first video communication terminal over the communication channel, wherein the first computer arrangement is configured and arranged to electronically alter data being sent to the display at the third video communication terminal in response to the direction signal from the movement-responsive sensor at the third video communications terminal, and wherein the first computer arrangement is configured and arranged to electronically alter data being sent to the display at the second video communication terminal in response to the direction signal from the movement-responsive sensor at the second video communications terminal, and wherein electronically altering the data includes electronically altering the data in a different manner for each display.

23. A video communication system, comprising:

a first video communication terminal including a first computer arrangement for processing data, including video data, that is communicated over a communications channel, and including a camera configured and arranged to capture images of a view, wherein the captured images are processed as data by the first computer arrangement for transfer over the communications channel, the computer arrangement being configured and arranged to transfer data, in response to a control signal received over the communications channel, representing an altered view being captured by the camera;

a second video communication terminal including a display, a movement-responsive sensor configured and arranged to generate a direction signal in response to corresponding movement of the display, and a second computer arrangement for processing data, including video data, for communicatively coupling with the first video communication terminal over the communications channel, the second computer arrangement being configured and arranged to respond to the movement-responsive sensor by sending the control signal to the first video communication terminal over the communications channel.

24. A video communication system, according to the claim 23, wherein the second video communication terminal further includes a supporting member that is physically coupled to the movement-responsive sensor, wherein the movement-responsive sensor generates a first signal in response to movement of the movement-responsive sensor relative to the [supportimg] *supporting* member, and wherein the second computer arrangement is further configured and arranged to respond to the first signal by sending the control signal to the first video communication terminal over the communications channel.

25. A video communication system, comprising:

a first video communication terminal including a first computer arrangement for processing data, including video data, that is communicated over a communications channel, and including a camera configured and arranged to capture images of a view, wherein the captured images are processed as data by the first computer arrangement for transfer over the communications channel;

a second video communication terminal including a display, a movement-responsive sensor configured and arranged to generate direction signals in response to corresponding movement of the display, and a second computer arrangement for processing data, including video data, for communicatively coupling with the first video communication terminal over the communications channel, the second computer arrangement being configured and arranged to store video data received over the communications channel and to respond to the movement-responsive sensor by changing data being sent to the display such that only a portion of the stored video data is displayed.

26. A video communication system, according to claim 25, wherein the second video communication terminal further includes a supporting member that is physically coupled to the movement-responsive sensor, wherein the movement-responsive sensor generates a first signal in response to movement of the movement-responsive sensor relative to the supporting member, and wherein the second computer arrangement is further configured and arranged to respond to the first signal by changing data being sent to the display such that only the portion of the stored video data is displayed.

27. A video communication system, according to claim 25, wherein the first computer arrangement is further configured and arranged to transfer data, in response to a control signal received over the communications channel, representing an altered view being captured by the camera.

28. For use in a video communication system having a first video communication terminal that processes data including video data, the first video communication terminal including a camera configured and arranged to capture images of a view and to transfer the captured images in the form of data over a communications channel, a second video communication terminal comprising:

a movement-responsive sensor;

a display physically coupled to a movement-responsive sensor, wherein the movement-responsive sensor is configured and arranged to generate a direction signal in response to corresponding movement of the display; and a second computer arrangement for processing data, including video data, for communicatively coupling with the first video communication terminal over the communications channel, wherein at least one of the first and second computer arrangements is configured and arranged to alter data being sent to the display in response to the direction signal from the movement-responsive sensor.

29. A method for communication, comprising:

gathering video data via a first communication terminal having a first computer arrangement for processing data including video data;

transferring video data over a communications channel;

receiving the video data via a second communication terminal having a display, having a second computer arrangement for processing data including video data, and coupled communicatively with the first communication terminal over the communications channel;

detecting movement of the display via a movement-responsive sensor configured and arranged to generate a direction signal in response to corresponding movement of the display;

generating a direction signal in response to the movement of the display; and altering the video data responsive to the direction signal from the movement-responsive sensor.

30. A method for communication, according to claim 29, wherein altering the video data includes altering at least one of the pan, tilt, and zoom aspects of the video data.

31. A method for communication, according to claim 29, wherein altering the video data includes altering the video data at the first communication terminal.

32. A method for communication, according to claim 29, wherein altering the video data includes altering the video data at the second communication terminal.

33. A video communication system, comprising:

a first video communication terminal including a first computer arrangement for processing data, including video data, that is communicated over a communications channel, and including a camera configured and arranged to capture images of a view, wherein the captured images are processed as data by the first computer arrangement for transfer over the communications channel; and a second video communication terminal including a display, means for sensing configured and arranged to generate a direction signal in response to corresponding movement of the display, and a second computer arrangement for processing data, including video data, for communicatively coupling with the first video communication terminal over the communications channel, wherein at least one of the first and second computer arrangements includes means for altering data being sent to the display in response to the direction signal.

34. A video communication system, according to claim 33, wherein the second computer arrangement is further configured and arranged to store video data received over the communications channel and to respond to the means for sensing by changing data being sent to the display such that only a portion of the stored video data is displayed.

35. A video communication system, according to claim 33, wherein the first computer arrangement is further configured and arranged to transfer data, in response to a control signal received over the communications channel, representing an altered view being captured by the camera.

36. A video communication system, according to claim 33, wherein the second video communication terminal includes means for supporting physically coupled to the display, and wherein the means for sensing generates a direction signal in response to movement of the means for supporting relative to the display.

37. A video communication system, according to claim 33, wherein the means for sensing engages a rigid member physically coupled to the display, and wherein the means for sensing generates a direction signal in response to movement of the rigid member relative to the display.

38. A video communication system, according to claim 33, wherein the first video communication terminal further includes a display, means for sensing configured and arranged to generate a direction signal in response to corresponding movement of the display, for communicatively coupling with the second video communication terminal over the communications channel.

39. A video communication system, according to claim 33, wherein the second video communication terminal further includes a camera configured and arranged to capture images of a view, wherein the captured images are processed as data by the second computer arrangement for transfer over the communications channel.

40. For use in a video communication system having a first video communication terminal that processes data including video data, the first video communication terminal including a camera configured and arranged to capture images of a view and to transfer the captured images in the form of data over a communications channel, a second video communication terminal comprising:

means for sensing;

a display physically coupled to the means for sensing, wherein the means for sensing is configured and arranged to generate a direction signal in response to corresponding movement of the display; and a second computer arrangement for processing data, including video data, for communicatively coupling with the first video communication terminal over the communications channel, wherein at least one of the first and second computer arrangements is configured and arranged to alter data being sent to the display in response to the direction signal from the means for sensing.

*41. A video communication system, comprising:*

*a first video communication terminal including a first computer arrangement for processing data, including video data, that is communicated over a communications channel, and including a camera configured and arranged to capture images of a view, wherein the captured images are processed as data by the first computer arrangement for transfer over the communications channel; and*

*a second video communication terminal including a display, a movement-responsive sensor configured and arranged to respond to corresponding movement of the second video communication terminal, and a second computer arrangement for processing data, including video data, for communicatively coupling with the first video communication terminal over the communications channel, wherein at least one of the first and second computer arrangements is configured and arranged to electronically alter data being sent to the display by electronically panning, tilting or zooming in response to the movement-responsive sensor.*

*42. The video communication system of claim 41, wherein the communications channel includes a wireless communications channel.*

*43. The video communication system of claim 41, wherein at least one of the first and second video communication terminals is a wireless communication terminal adapted to send a wireless communication over the communications channel.*

*44. The video communication system of claim 41, wherein the second video communication terminal is adapted to send wireless communications, and wherein the communications channel includes a wireless communications channel and a POTS line.*

*45. In a video communication system having a video communication terminal including a data processing arrangement for processing data, including video data, that is communicated over a communications channel, and including a camera configured and arranged to capture images of a view, wherein the captured images are processed by the data processing arrangement for transfer over the communications channel, a telephony terminal comprising:*

*a display;*

*a movement-responsive sensor configured and arranged to respond to movement of the telephony terminal; and*

*a computer arrangement for processing data, including a general-purpose processor and including a digital signal processor for processing video data, the computer arrangement adapted for communicatively coupling with the video communication terminal over a wireless portion of the communications channel, wherein at least one of the data processing arrangement and the computer arrangement is configured and arranged to electronically alter data being sent to the display by electronically panning, tilting or zooming in response to the movement-responsive sensor.*

* * * * *